March 9, 1971     W. R. SMITH ETAL     3,568,421
LAWN MOWER
Filed March 12, 1968     6 Sheets-Sheet 1
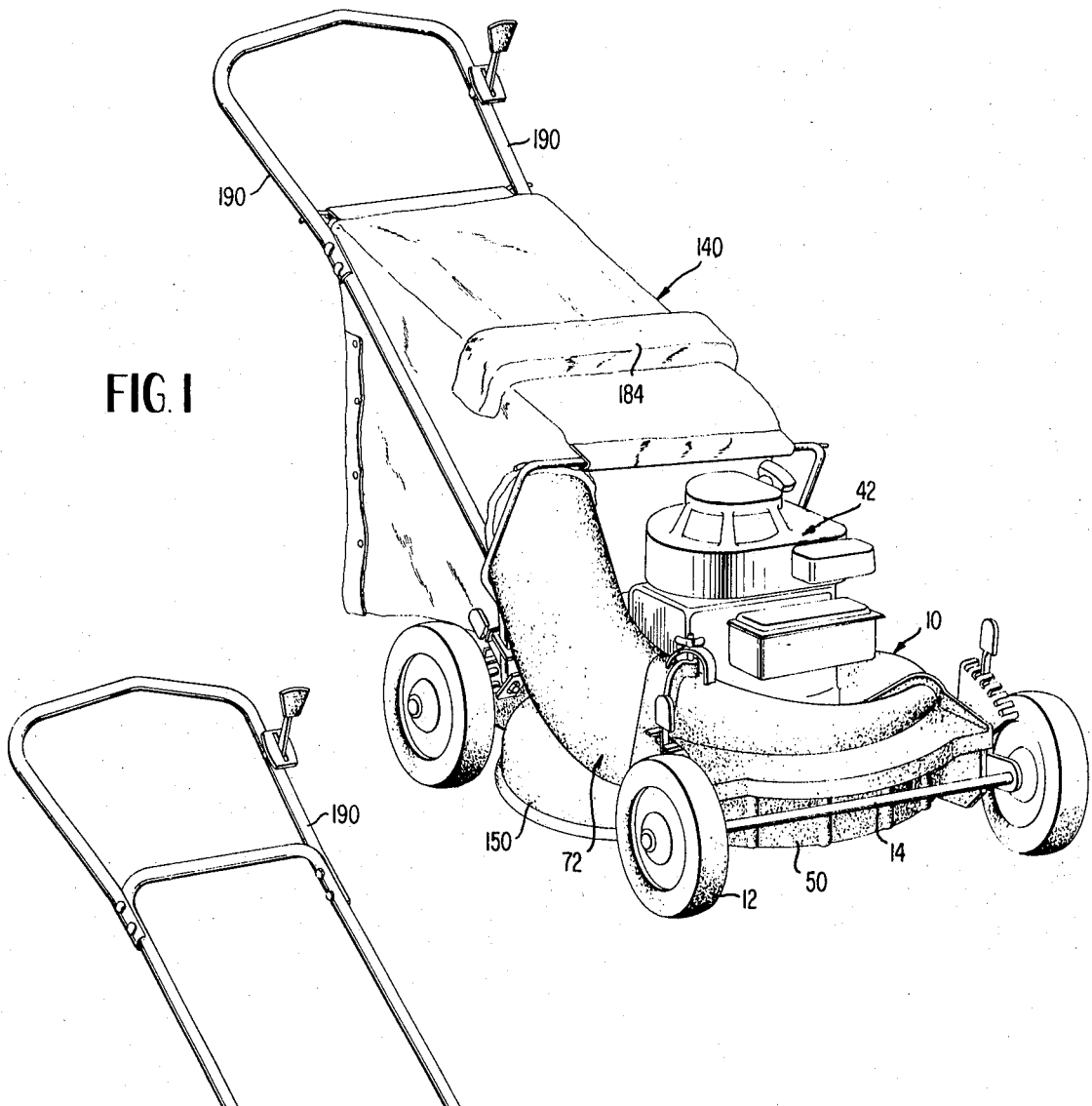
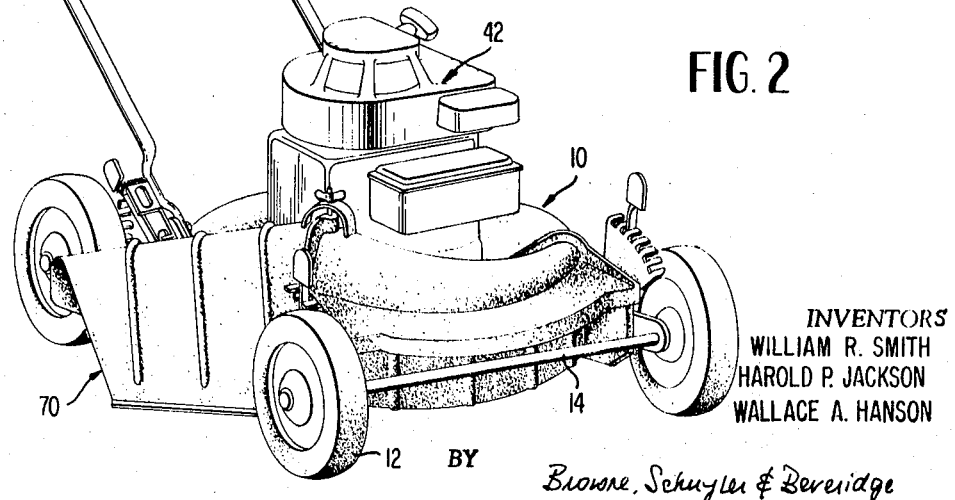
INVENTORS
WILLIAM R. SMITH
HAROLD P. JACKSON
WALLACE A. HANSON
BY Browne, Schuyler & Beveridge
ATTORNEYS March 9, 1971 W. R. SMITH ETAL 3,568,421
LAWN MOWER
Filed March 12, 1968 6 Sheets-Sheet 2
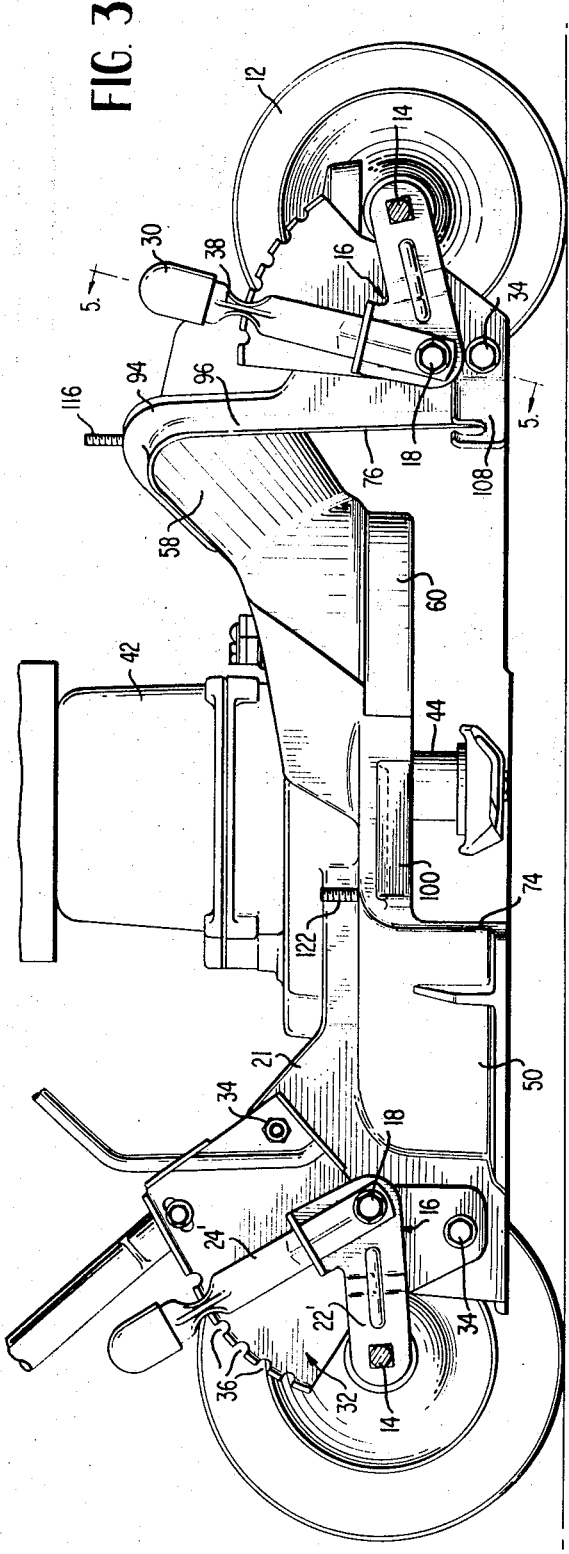
FIG. 3
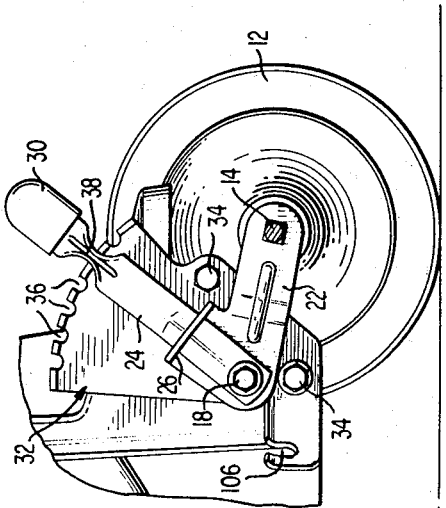
FIG. 6
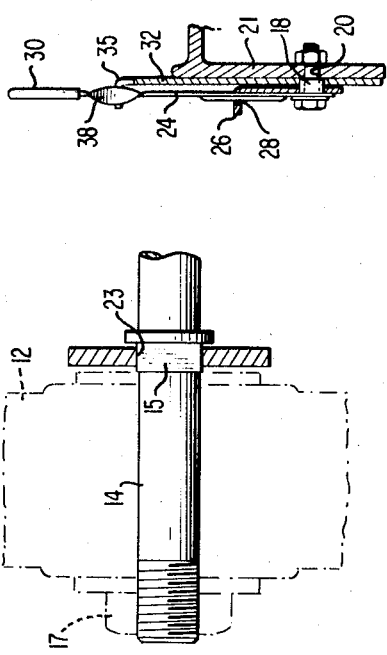
FIG. 5
FIG. 4

March 9, 1971     W. R. SMITH ETAL     3,568,421
LAWN MOWER
Filed March 12, 1968     6 Sheets-Sheet 4

INVENTORS
WILLIAM R. SMITH
HAROLD P. JACKSON
WALLACE A. HANSON

BY Browne, Schuyler & Beveridge
ATTORNEYS

March 9, 1971 W. R. SMITH ETAL 3,568,421
LAWN MOWER
Filed March 12, 1968 6 Sheets-Sheet 5
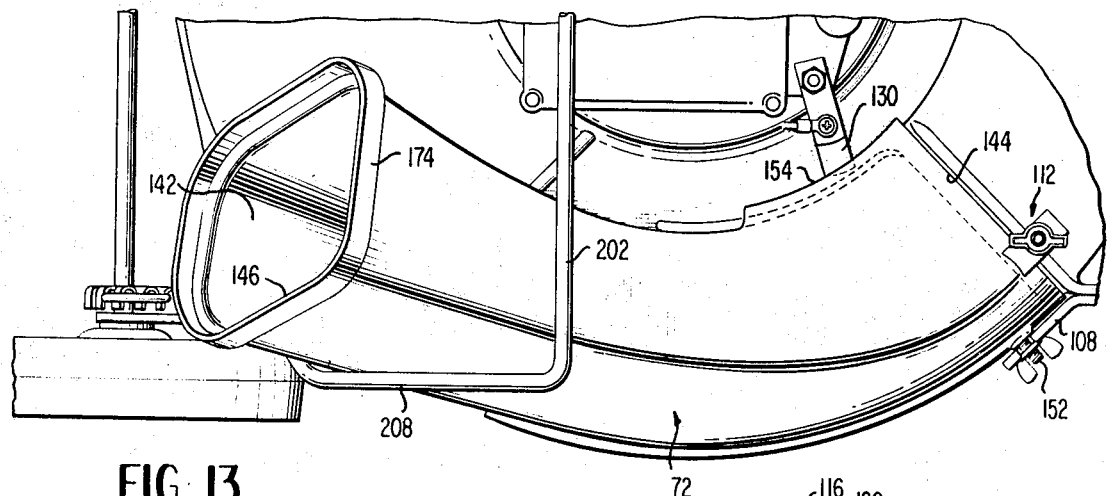
FIG. 13
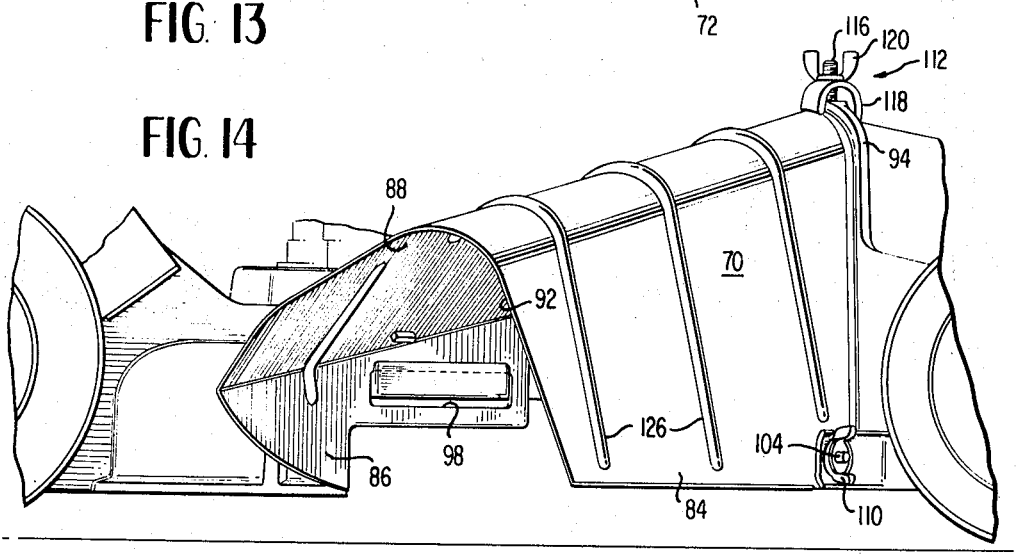
FIG. 14
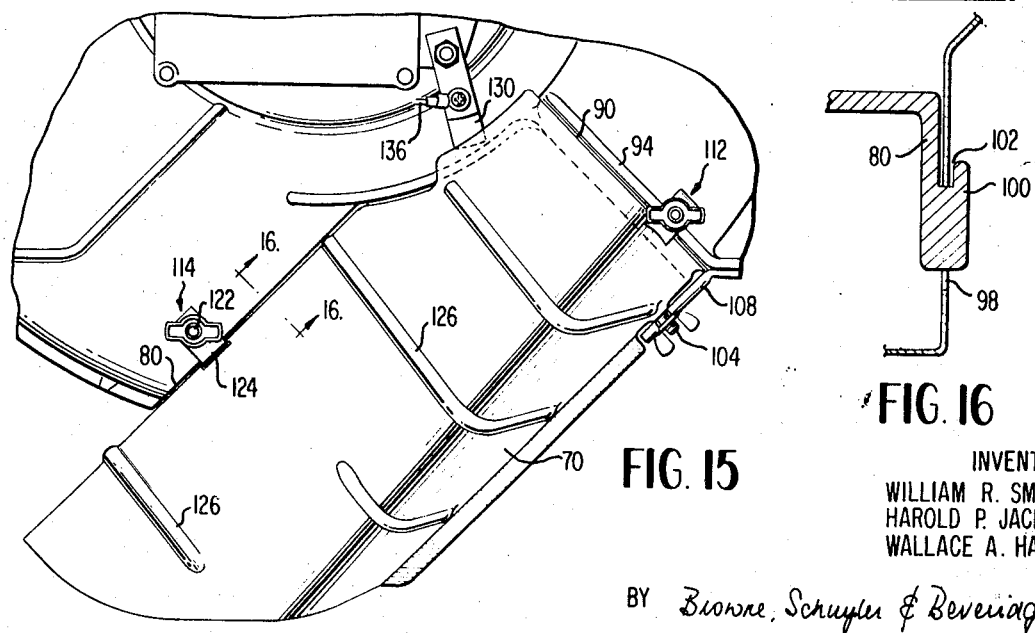
FIG. 15
FIG. 16
INVENTORS
WILLIAM R. SMITH
HAROLD P. JACKSON
WALLACE A. HANSON
BY Browne, Schuyler & Beveridge
ATTORNEYS

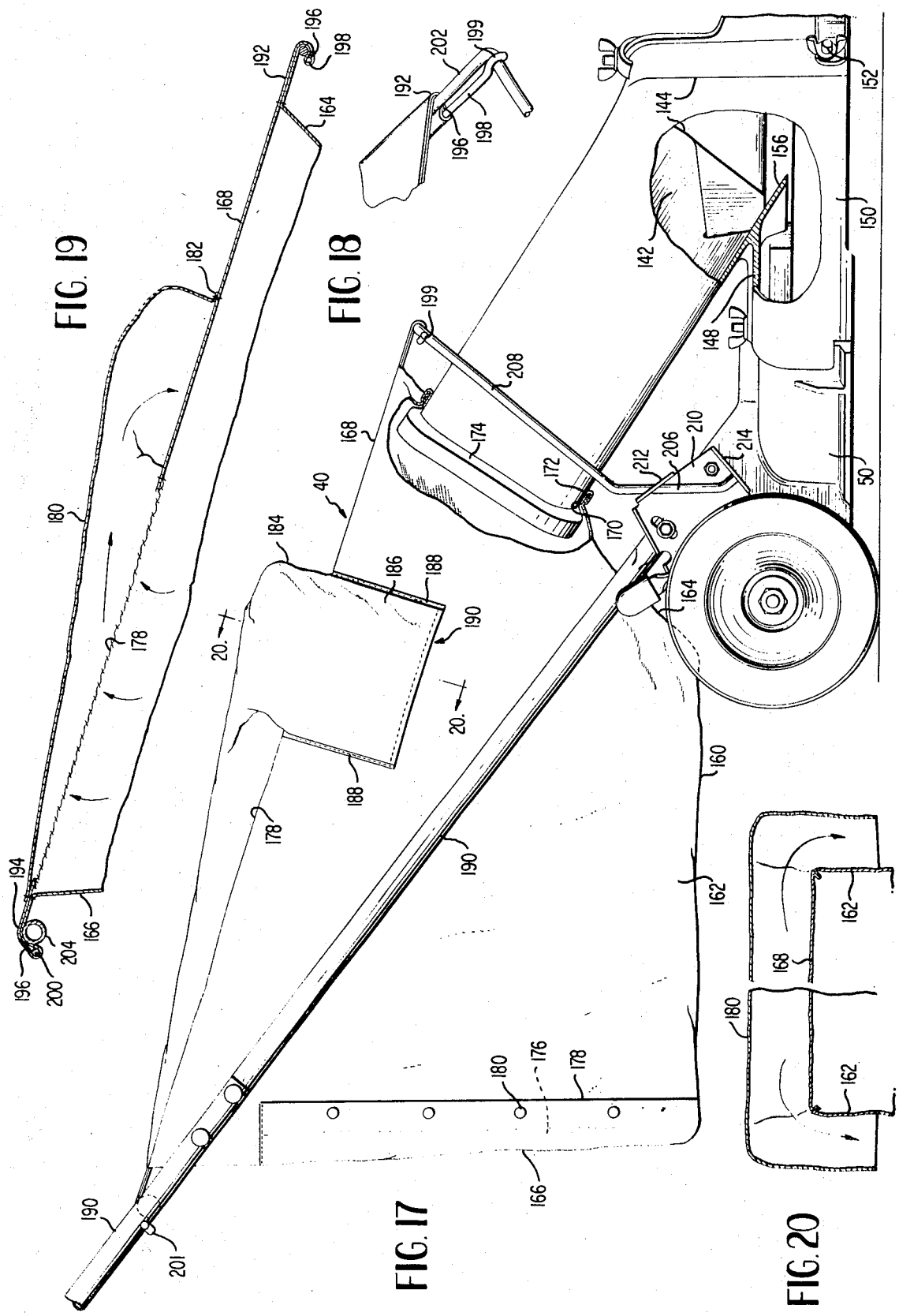

United States Patent Office 3,568,421
Patented Mar. 9, 1971

3,568,421
LAWN MOWER
William R. Smith and Harold P. Jackson, McDonough, and Wallace A. Hanson, Riverdale, Ga., assignors to McDonough Power Equipment, Inc., McDonough, Ga.
Filed Mar. 12, 1968, Ser. No. 712,407
Int. Cl. A01d 55/18
U.S. Cl. 56—255                                    20 Claims

ABSTRACT OF THE DISCLOSURE

A power lawn mower including a housing having a top and a depending peripheral skirt enclosing a rotary cutting blade driven by a motor centrally mounted on the housing. Grass clippings cut by the blade are swept upwardly and annularly in the mower housing in an annular discharge duct which progressively increases in height from the rear to the front of the housing and terminates in an outlet which is connected either to a lateral discharge chute or rear discharge chute. Depending on the type of discharge desired, the discharge chutes are alternately attached to the mower housing in communication with the discharge passage. When the rear discharge chute is employed, it conveys grass clippings rearwardly and upwardly into a collector bag supported at the rear of the mower.

SUMMARY OF INVENTION

The present invention generally pertains to power lawn mowers and has for one of its objects, the provision of a new and improved power lawn mower.

A further object of the present invention is to provide a novel power lawn mower that may be employed as desired to discharge grass clippings either laterally of the mower or rearwardly into a grass collector supported at the rear of the mower. Included herein is the provision of two improved discharge chutes either of which may be employed as desired in conjunction with the mower depending on the type of grass discharge desired.

A further object is to provide such a lawn mower having a blade housing formed with a novel discharge passage which allows grass clippings to be swept upwardly and annularly in the housing for discharge in an improved manner.

Another object of the present invention is to provide a novel grass collector and means for supporting it at the rear of the mower. A further object is such a grass collector having a lightweight construction of relatively large grass collecting capacity which moreover may be emptied of its contents in a relatively simple manner and while the collector is supported in operative position on the mower.

A still further object is the provision of an improved mechanism for adjusting the height of the mower housing relative to the ground over which it travels.

Another object of the present invention is to provide such a power lawn mower that may be easily handled while having a safety feature which cuts off power for rotating the cutter blade when either of the discharge chutes is removed from the mower housing.

Yet another object of the present invention is to provide a high quality mower which will achieve the above objects while being commercially feasible to manufacture and retail at prices competitive with other power mowers now on the market.

One embodiment of the invention achieving the foregoing objects includes a blade housing supported for movement over the ground by front and rear axle assemblies each including a continuous axle extending across the mower with wheels rotatably mounted on its opposite ends. The mower is connected to each axle by a pair of bell cranks which receive the opposite ends of the axle while being pivoted to the housing for adjusting the position of the axle relative to the housing. The bell cranks are maintained in their adjusted positions by notched latch plates fixed to the housing and respectively receiving portions of the bell cranks to hold them in adjusted position against movement.

The blade housing includes a top wall and an outer peripheral skirt depending from the top wall to enclose a rotary cutting blade that is driven by a motor mounted on the central portion of the top wall. An annular top wall portion interconnects the central portion and the peripheral skirt while gradually increasing in height from an inlet located generally at the rear of the housing to an outlet located in the front quadrant of the housing spaced approximately 225° from the inlet. An annular grass discharge passage is thus formed in the top wall of the housing for directing grass clippings upwardly and annularly in the housing for discharge through the outlet.

After the grass clippings leave the outlet of the discharge passage formed in the housing, they may be directed by one of two chutes removably attached to the mower housing in communication with the outlet. One chute is dimensioned and constructed to direct grass clippings laterally and downwardly of the mower housing. This chute is secured in an opening in the mower housing which extends partly in the top wall and partly in the skirt adjacent the outlet of the discharge passage.

The other chute directs grass clippings upwardly and rearwardly from the mower housing for receipt in a grass collector mounted rearwardly of the mower housing. This rear discharge chute has a horizontal flange which covers the portion of the opening in the top wall housing, and a vertical flange which covers the portion of the opening in the skirt to in effect, form a continuation of the skirt.

The grass collector is in the form of a flexible bag having front and rear mounting flaps which are tensioned and secured about horizontal support elements one of which is secured to the mower housing above the rear end thereof, while the other is secured between the handle bars of the mower. An inlet opening is provided in one end wall of the bag receiving the outlet of the rear discharge chute. An elongated opening having a closure flap is provided adjacent the opposite end wall of the bag for removing grass clippings. To exhaust air from the bag, a foraminous top wall is formed in the bag along with an overlying wall and side exhaust passages for directing the air first laterally and then downwardly along opposite sides of the bag.

Other objects and advantages of the present invention will become apparent from the following more detailed description in conjunction with the accompanying drawings in which:

FIG. 1 is a perspective view of a power lawn mower embodying the present invention and equipped with a grass collector and a rear discharge chute attachment for directing grass clippings into the collector;

FIG. 2 is a perspective view generally similar to FIG. 1 except that a different discharge chute is attached to the mower for lateral discharge of the grass clippings and the grass collector is omitted;

FIG. 3 is an enlarged, right hand side view of the mower housing without either grass chute attached;

FIG. 4 is a fragmental front view of an axle and wheel assembly used in supporting the mower for movement on the ground;

FIG. 5 is a cross-sectional view taken generally along lines 5—5 of FIG. 3;

FIG. 6 is a view of the wheel and axle assembly and an associated mounting element as generally shown in the front portion of FIG. 3, but with the parts in a different adjusted position;

FIG. 13 is a fragmental, top plan view of the right hand side of the mower housing with the rear discharge chute attached;

FIG. 14 is a fragmental, elevational view of the right hand side of the mower housing with the lateral discharge chute attached;

FIG. 15 is a fragmental top plan view of the mower housing and lateral discharge chute shown in FIG. 14;

FIG. 16 is an enlarged, cross-sectional view taken generally along lines 16—16 of FIG. 15 illustrating a key and slot connection for securing the lateral discharge chute to the mower housing;

FIG. 17 is an enlarged, right hand side view of the lawn mower as shown in FIG. 1;

FIG. 18 is a fragmental, perspective view illustrating the mounting of the front end of the grass collector;

FIG. 19 is a longitudinal, cross-sectional view taken along the top wall of the grass collector;

FIG. 20 is a cross-sectional view taken generally along lines 20—20 of FIG. 17 illustrating air exhaust ducts for exhausting air downwardly along the sides of the grass collector.

DETAILED DESCRIPTION

Figure 7:
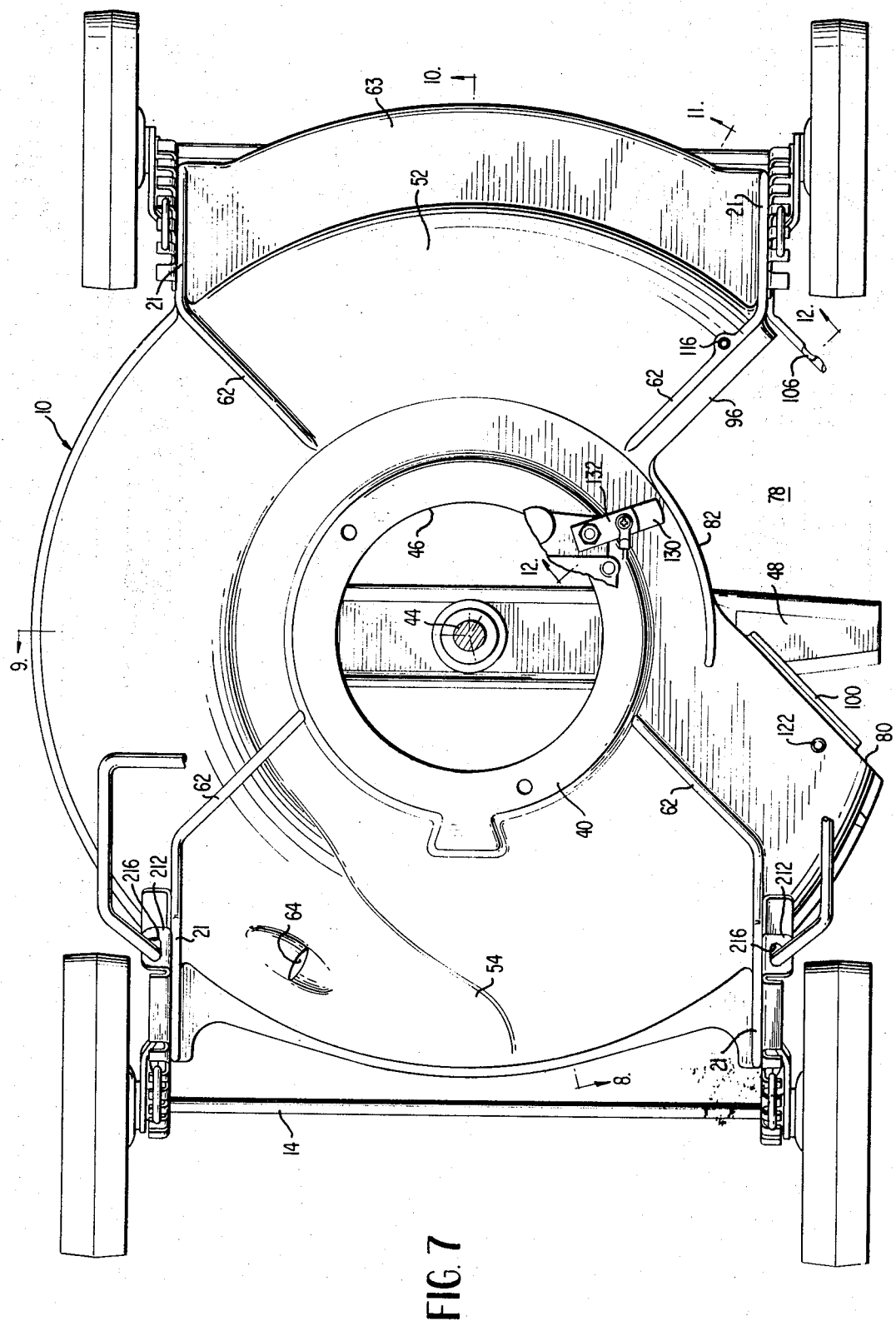
FIG. 7 is a plan view of the mower housing omitting the discharge chutes and the engine employed to drive the cutting blade.
Figure 8:
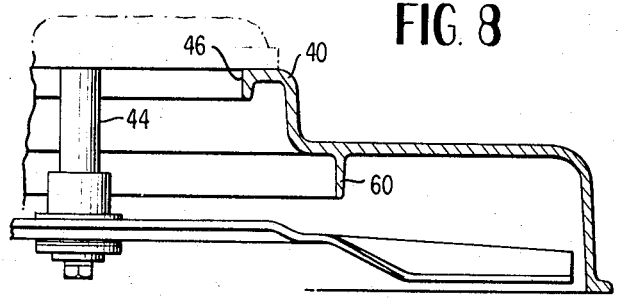
FIG. 8 is a fragmental, cross-sectional view of the mower housing taken generally along line 8 of FIG. 7.

Referring now to the drawings in detail, FIG. 1 shows a power lawn mower embodying the present invention, including a generally circular blade housing 10 typically supported at its front and rear ends by wheels 12 rotatably mounted on axles 14 to roll over the ground with the lower edges of the housing spaced above the ground. Axles 14 extend continuously across the housing and are adjustably suspended from the latter by bell cranks generally designated 16 pivotally mounted by pivots 18 to the sides of the housing as shown in FIGS. 3 and 5. As illustrated, pivots 18 may be formed by nut and bolt assemblies secured in apertures 20 formed in vertical web portions 21 of the housing on opposite sides at the front and rear ends thereof.

Bell cranks 16 which mount the front axle each include a first arm 22 having a square aperture 23 in its extremity receiving an enlarged square shoulder 15 of axle 14. The fit of arm 22 on square shoulder 15 prevents relative rotation between the axle and bell crank thus minimizing wear between these parts. This feature also facilitates assembly of nuts 17 on the ends of the axle since nuts 17 may be advanced without employing a tool to secure the axle against rotation.

Bell crank 16 further includes a second arm 24 having an aperture receiving pivot 18. Arm 24 is fixed against movement relative to its associated arm 22 by means of a flange 26 integral with arm 22 and having an elongated slot 28 receiving arm 24 as shown in FIG. 5. It will thus be seen that arms 22 and 24 may be pivoted together as a unit about pivot 18 to change the elevation of axle 14 relative to the mower housing. Movement of the bell crank is effected manually by grasping the top end of arm 24 which may be fitted with a smooth cap 30 to protect the fingers.

In order to retain the bell cranks and consequently the axle and wheels in the desired adjusted position, latch plates 32 are fixed such as by bolts 34 to the vertical web portions 21 of the housing. Latch plates 32 have a curved flange 35 extending generally in the forward-rearward direction of the mower housing and formed with a series of notches 36 dimensioned to receive an intermediate portion 38 of the associated bell crank arm 24 which is shown as being reduced in dimension. The number of notches 36 in each latch plate corresponds to the number of different positions into which the wheels and axles may be adjusted. Bell crank arm 24 is made from flexible resilient material such as sheet steel to permit it to be flexed laterally outwardly for removal from notches 36 to permit adjustment. Upon release of arm 24, its inherent resilience will cause it to return into one of notches 36. Since in the shown embodiment the wheels are mounted on a common axle, the bell cranks associated with each axle should be stepped alternately one notch at a time during adjustment in order to avoid excessive torsional stress on the axle.

The bell cranks which mount the rear axle are similar to the front bell cranks except that their arms 22 and 24 are reversed in position since the position of the rear wheels is behind the pivot 18.

Blade housing 10 includes a top wall having a central or hub portion 40 to which is secured a motor 42 having a vertically depending drive shaft 44 extending into the interior of the housing through an opening 46 in the hub. A rotary cutter blade 48 is fixed to the lower end of drive shaft 44 to be driven thereby in rotation in a plane generally parallel to ground surface. Although the motor shown is of the internal combustion type, an electric motor may also be employed if desired. Cutter blade 48 may have a conventional construction including an inclined trailing edge for facilitating the cutting of the grass while also producing an impeller action for creating an up-draft lifting the cut grass clippings for discharge as will be further described.

Blade housing 10 further includes a peripheral, generally cylindrical skirt 50 depending from its top wall to enclose the cutter blade with the ends of the blade spaced slightly inwardly from the skirt as shown in FIG. 7. The height of skirt 50 is made sufficient to insure there will be space between the blade and the top wall of the housing for permitting grass clippings to flow outwardly of the housing without clogging against the underside of the top wall of the housing.

In addition to hub portion 40, the top wall of the mower housing further includes an annular web portion 52 which extends around the hub portion and integrally connects it to skirt 50. Referring to FIG. 7, a substantial part of the web portion starting generally at the rear of the housing at 54, gradually increases in height for an angular distance of approximately 225° to define a grass discharge passage 56 in the mower housing. Discharge passage 56 terminates in an outlet 58 which lies in a radial plane in the right front quadrant of the mower housing. Discharge passage 56 in part is also defined by an internal cylindrical skirt 60 depending downwardly into the interior of the housing from hub portion 40 in generally concentric relation to outer skirt 50. Thus the radial distance between the inner and outer skirts when measured in a horizontal plane is generally constant throughout the housing as illustrated in FIGS. 8 through 12. In addition to preventing the flow of grass clippings inwardly into the area below hub portion 40, internal skirt 60 also provides a protective barrier preventing rocks and other matter from striking the blade drive shaft. In operation, the gradual increase in height and volume in addition to the location and extent of the discharge passage, causes the grass clippings to be swept upwardly and annularly therein to provide smooth and unimpeded grass flow out of the housing through outlet 58.

Preferably, the blade housing has an integral construction cast from a suitable lightweight but strong material such as magnesium. For reinforcement vertical strengthening ribs 62 may be incorporated in the housing to project radially from the top wall and emerge into web portions 21 respectively as shown in FIG. 7. Also in the preferred embodiment, a front ledge 63 is formed between the front web portions 22 to overlie the front axle. Additionally a water inlet passage 64 is provided in the housing top wall at the left rear quadrant for permitting a water hose to be inserted therein for cleaning the interior of the housing.

Cut grass clippings are directed out of the mower housing by either of two chute attachments generally designated 70 and 72. As shown in FIG. 2, chute 70 is employed to direct grass clippings laterally and partly rearwardly from the mower housing to the ground. To accommodate the chutes, the mower housing is formed with an opening in its skirt, defined by vertical skirt edges 74 and 76. This opening also extends at 78 into the top of the mower housing rearwardly of outlet 58 of the discharge passage as shown in FIGS. 3 and 7. Portion 78 of the housing opening is defined by a flat vertical wall 80 which merges into a vertical curved wall 82 corresponding to the curvature of inner skirt 60. In the shown form, skirt edge portions 74 and 76 which define the opening in the skirt are spaced approximately 60° while curved wall 82 which defines a portion of the opening in the housing top wall extends approximately 40°. Additionally housing wall 80 defining the rear end of the opening lies in a plane extending generally 90° to the plane drawn through outlet 58 of the discharge passage.

Referring to FIGS. 2, 14 and 15, lateral discharge chute 70 includes opposite side walls 84 and 86 and a top wall 88 extending between the side walls and inclined downwardly from side wall 84 to the opposite side wall 86. The opposite ends 90 and 92 of the chute are open and form a grass inlet and outlet. The top wall 88 is also inclined downwardly from inlet 90 to outlet 92 so as to discharge grass clippings and any rocks which might be included, downwardly into the ground to avoid possible injurious contact with persons located in the area of operation.

To locate and secure lateral discharge chute 70 in operative position on the mower housing, the latter is formed with a flange 94 about outlet 58 of the discharge passage to abuttingly receive the inlet 90 of the chute which is dimensioned correspondingly and rests on housing portion 96 (see FIG. 3). Side wall 86 is located in position by means of an elongated slot 98 shown as rectangular and dimensioned to be received over a key 100 formed on the housing wall 80 which defines the rear end of opening 78. As shown in FIG. 16 the top edge of slot 98 is received in a key recess 102 and the slot depth is made sufficiently greater than that of the key to allow removal of the chute by lifting the chute to remove the top edge of slot 98 from recess 102 and then pulling the chute laterally off the key.

The other side wall 84 of chute 70 is located by means of a bolt 104 projecting outwardly adjacent its inlet. Bolt 104 is placed into a vertical slot 106 in a bracket 108 that is secured to the housing to extend generally tangentially beyond the lower end of skirt edge 76 as shown in FIG. 3. In the specific embodiment illustrated, bracket 108 is formed integral with the adjacent latch plate 32. Once chute 70 is properly located in the housing as described above, a wing nut 110 is applied on bolt 104 and secured against bracket 108.

In addition, clamp assemblies 112 and 114 are installed to further secure the chute. Clamp assembly 112 in the specific form shown, includes an upstanding threaded bolt 116 fixed in flange 94 above the discharge passage outlet 58; and a generally U-shaped clamp 118 having an aperture receiving bolt 116 with the opposite ends of the clamp extending through elongated slots formed in the chute top wall 88 and the adjacent top portion of the blade housing. A wing nut 120 is applied on bolt 116 and secured against clamp 118 to fasten the inlet end of chute 70 in place.

The other clamp assembly 114 is similar, and includes a threaded bolt 122 fixed to the top of the blade housing adjacent wall 80 and a U-shaped clamp 124 received on bolt 122 with its extremities extending through apertures formed in the chute and the mower housing. A wing nut on bolt 122 is employed to complete the assembly.

To facilitate placement and removal of chute 70 it is formed from a slightly flexible sheet material such as sheet steel so that its opposite side walls 84 and 86 may be flexed inwardly to properly seat the chute prior to securement by the clamps. Preferably chute 70 has an integral construction including reinforcing ribs 126 extending transversely in the chute walls as shown in the drawings.

Figure 12:
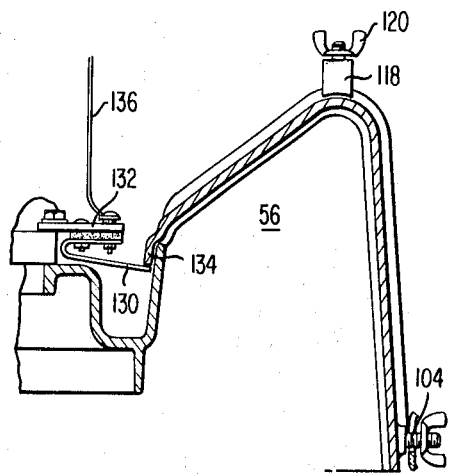
FIG. 12 is a fragmental, cross-sectional view taken generally along line 12 of FIG. 7.
Figure 9:
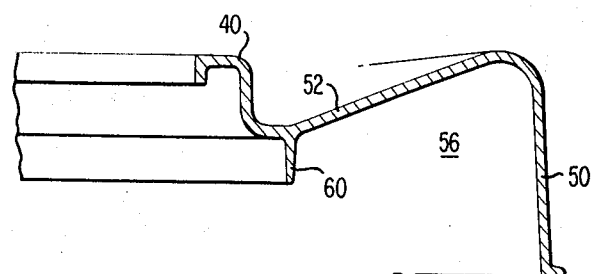
FIG. 9 is a fragmental, cross-sectional view taken generally along line 9 of FIG. 7.
Figure 10:
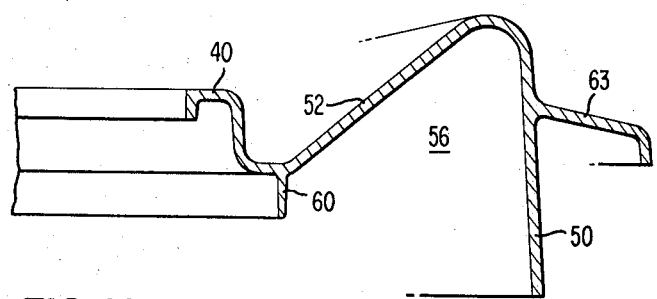
FIG. 10 is a fragmental, cross-sectional view taken generally along line 10 of FIG. 7.

For safety purposes the mower of the present invention is provided with a safety feature for deenergizing motor 42 when either of chute 70 or 72 is removed from the mower housing. In the illustrated embodiment this feature includes a ground contact 130 secured with respect to the housing hub 40 through means of a bracket 132 bolted to hub 40. Contact 130 extends outwardly from the hub to engage downwardly extending portion 134 of chute 70 when the latter is secured in place on the mower as shown in FIGS. 12 and 15. Contact 130 is connected to the primary circuit of the ignition system (not shown) of motor 42 by means of a wire 136. It will be seen that when chute 70 is removed from the mower housing, a short circuit will be established causing deenergization of motor 42 and cutting blade 48 to come to a stop, assuming that the motor was energized during detachment of the chute.

Referring to FIG. 1, rear discharge chute 72 is employed when it is desired to direct the grass clippings rearwardly of the mower into a grass collector generally designated 140 to be described in greater detail. In the illustrated embodiment, rear discharge chute 72 has an elongated body defining a grass discharge passage 142 of generally rectangular cross-section (see FIG. 13). The opposite ends of chute 72 are open and define an inlet 144 dimensioned to be placed in registry with outlet 58 of the housing discharge passage 56, and an outlet 146 adapted to be received in grass collector 140.

For mounting and securing rear discharge chute 72 to the mower housing, the chute is provided with a horizontal flange 148 dimensioned to overlie and engage the top portion of the mower housing rearwardly of opening 78 as shown in FIG. 18. Chute passage 142 extends generally 30° relative to horizontal flange 148 so that when the chute is attached to the mower, chute passage 142 extends upwardly and rearwardly at the same angle as shown in FIGS. 1 and 17.

Additionally chute 72 has a vertical flange 150 dimensioned to overlie the opening in outer skirt 50 to in effect, form a continuation of the outer skirt when the chute is attached to the mower housing. Vertical flange 150 of the chute has a curvature generally corresponding to outer skirt 50 of the mower housing. Similarly, portions of chute 72 at the lower end adjacent the inlet thereof are curved to generally conform to the curvature of the discharge passage in the mower housing as illustrated in FIG. 13. The shape of inlet 144 of the chute generally corresponds to outlet 58 of discharge passage 56.

When attaching chute 72, its inlet is placed on housing portion 96 which extends about outlet 58 of the blade housing. Chute 72 is initially located and placed on the mower housing by means of an aperture formed in horizontal flange 148 to receive bolt 122 on the mower housing. Additionally, a threaded bolt 152 projecting outwardly from chute 72 at the lower inlet end thereof is placed in slot 106 of bracket 108 in the same manner described above in connection with side chute 70. Once located in proper position on the mower housing, rear discharge chute 72 is secured by wing nuts 120 fastened on bolts 122 and 152 and also by clamp assembly 112 as described above.

As shown in FIG. 13 the rear discharge chute, when attached, registers with housing outlet 58 while covering the opening in the mower housing such that grass clippings will be conveyed upwardly and rearwardly through the discharge chute for deposit in grass collector 140. As with lateral discharge chute 70, the rear discharge chute has an integral projection 154 which engages ground contact 130 for safety purposes as described above.

In order to insure that grass clippings will be conveyed upwardly into rear discharge chute 72 after leaving outlet 58 of the housing, a stripper or deflector 156 is integrally formed with the chute to project downwardly into the mower housing at an oblique angle, of approximately 30° as shown in FIG. 17. Deflector 156 functions to prevent grass clippings from being recirculated in the mower housing by deflecting the grass clippings upwardly through the rear discharge chute passage 142.

Referring now to FIGS. 17 to 20, grass collector 140 is in the form of a bag made from suitable flexible material and including a bottom wall 160, opposite side walls 162, front and rear walls 164, 166 and a top wall 168. When the bag is unfolded for use such as shown in FIGS. 1 and 17, side walls 162 are generally parallel to each other while rear wall 166 extends vertically and front wall 164 extends forwardly at an angle to bottom wall 160. Additionally top wall 168 extends downwardly from rear wall 166 to front wall 164.

Grass clippings leaving rear discharge chute 72 enter the bag through an inlet opening 170 formed in front wall 164 at a location offset towards the right hand side of the mower. For securing the front wall of the bag about the rear discharge chute, front wall 164 is provided with an elastic band 172 dimensioned to seat firmly about the outlet of rear discharge chute 72. Preferably, the outlet of rear discharge chute 72 is provided with a flange 174 to prevent accidental withdrawal of the bag from the rear discharge chute.

Figure 21:
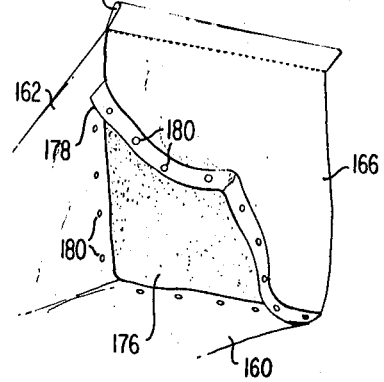
FIG. 21 is a fragmental perspective view of the rear end of the grass collector showing a closure flap in partly open position.
Figure 11:
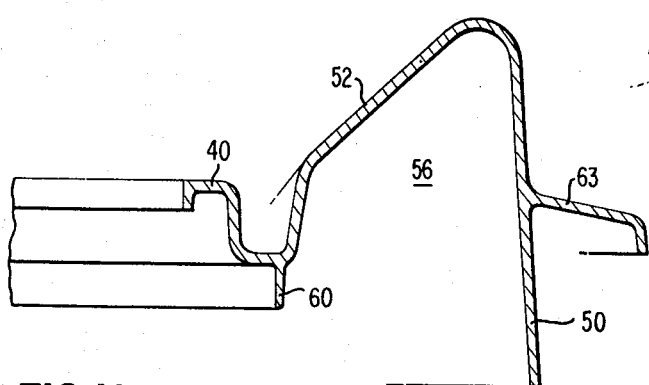
FIG. 11 is a fragmental, cross-sectional view taken generally along line 11 of FIG. 7.

To empty the contents of the collector bag, an elongated opening 176 is formed along the bottom and side walls adjacent rear wall 166 as shown in FIG. 21. A suitable closure flap 178 with snaps 180 is provided to close this opening during operation of the mower. It will be appreciated that the contents of the bag may be emptied through opening 176 without having to remove the bag from the mower.

In order to exhaust air from the bag during operation of the mower, top wall 168 in its rear section 178 is formed with a foraminous construction. The flow of air leaving the bag is controlled by what will be referred to as the "outer top wall" 180 attached over the foraminous section 178 as shown in FIGS. 17, 19 and 20. The rear and opposite side edges of outer top wall 180 are sealed to the underlying top wall 168, 178 so that air exiting through foraminous section 178 is deflected by the outer wall 180 generally in the forward direction. The air is then guided across top wall 168 and then downwardly along opposite side walls 162 by sealing the forward end 182 of outer wall 180 to wall 168 and by forming a transverse conduit 184 whose opposite end sections 186 extend downwardly on opposite side walls 162. Conduit end sections 186 are sealed at 188 to side walls 162, to define outlets 190 which direct the air downwardly.

Collector bag 140, is mounted and secured between the handle bars 190 by means of flexible flaps 192, 194 attached at the opposite ends of top wall 168 to form an extension of the latter. Flaps 192, 194 have transverse passages 196 dimensioned to respectively receive rigid mounting elements 198, 200 which may be steel rods, with the opposite ends of the latter projecting from the opposite ends of the flaps. In securing the flaps 192, 194 to the mower, they are tensioned in opposite directions about transversely extending support elements 202, 204 with mounting rods 198, 200 engaged against support elements 202, 204 as shown in FIGS. 17, 18 and 19. The rear support element 204 is secured between handle bars 190 and may have a tubular construction as shown. Preferably the opposite ends 199, 201 of mounting rods 198, 200 are curved to conform to the curvature of the handle bars 190 and vertical support elements now to be described.

The forward support element 202 is mounted with respect to the mower housing by vertical support elements formed integral therewith. The vertical support elements, which may be in the form of steel rods as shown, include two parallel vertical legs 206, and two arms 208 extending at an angle to the legs of about 140° and terminating in forward mounting element 202. Legs 206 are secured on the mower housing by means of brackets 210 which, in the illustrated embodiment, are integral extensions of rear latch plates 32. Brackets 210 include outwardly extending flanges 212, 214 having aligned apertures 216 receiving legs 206 as best shown in FIGS. 7 and 17. When assembled, the right hand leg 206 and arm 208 are positioned on the outside of rear discharge chute 72 as shown in FIG. 17.

To summarize mounting of the collector bag, and assuming that the bag is unfolded, mounting rods 198, 200 are first placed through flaps 192, 194 with one end of each rod retracted from the end of the associated flap. The flaps are then tensioned about horizontal support elements 202, 204 and then mounting rods 198, 200 are extended through the flaps so that rear mounting rod 200 is engaged below handle bars 190 and in contact with rear support element 204; and the opposite ends of front rod 198 are engaged on arms 208 with the intermediate portion of front rod 198 engaged against front support element 202. The inlet opening 170 of the bag may then be placed about the outlet of chute 72 to ready the bag for operation.

In order to remove the collector bag from the mower, the above steps are essentially reversed. The front support element 202 and its associate vertical support elements 206, 208 may also be removed from the mower by upward pulling to remove legs 206 from bracket flanges 212, 214.

What is claimed is:

1. A blade housing for a power lawn mower, the housing including front and rear ends, a top and an outer peripheral skirt depending from the top to define a space for housing a rotary blade, said top including an apertured central portion for receiving a motor which drives the blade, and an annular portion interconnecting said central portion and said skirt, said annular top portion extending arcuately generally from the rear end of the housing to and around the front end of the housing for an angular distance between 180 and 270 degrees while gradually increasing in height to define a grass discharge passage in the housing, said grass discharge passage having an outlet facing partly rearwardly and partly laterally of the housing, and said housing having an opening extending in said top portion and skirt to the lower edge thereof adjacent the outlet of said discharge passage for accommodating a discharge chute used to direct grass clippings from the outlet of said discharge passage, said housing having an edge portion in said skirt and top portion defining the rearwardly positioned side of said opening, said edge portion being sufficiently spaced from said outlet for permitting said opening to receive a chute in alignment with said outlet and in abutting engagement with said edge portion for directing grass clippings laterally outwardly from the outlet.

2. The mower housing defined in claim 1, wherein the lateral distance between said central top portion and said skirt measured in a horizontal plane, remains generally constant throughout a substantial portion of said discharge passage.

3. The mower housing defined in claim 2, wherein, said discharge passage extends an angular distance of approximately 225 degrees.

4. The mower housing defined in claim 3, further including an internal annular skirt depending from said central top portion in the space enclosed by the housing and in substantially concentric relationship with said outer skirt.

5. In combination with the mower housing defined in claim 1, a discharge chute adapted to be attached to the mower housing in communication with the outlet of said discharge passage with the chute extending upwardly and rearwardly of the mower housing to direct grass clippings in the same direction.

6. The combination defined in claim 5, wherein said discharge chute has a horizontal flange dimensioned to seat on the top of said housing to close the opening in said top, and a generally vertical flange dimensioned to close the opening in the outer skirt and thereby form a part of the skirt when the chute is attached to the housing.

7. The combination defined in claim 6, wherein said chute extends at an angle of approximately thirty degrees relative to the horizontal flange of the chute.

8. The combination defined in claim 7, wherein said chute has a portion projecting below said horizontal flange for deflecting grass clippings upwardly into the chute when the chute is attached to the mower housing.

9. In combination with the housing defined in claim 1 a discharge chute adapted to be attached in the opening in the mower housing in communication with the outlet of the discharge passage for conveying grass clippings out of the mower housing in a partly rearward and lateral direction, and means for removably securing the discharge chute to the mower housing in said opening thereof.

10. The combination defined in claim 9, wherein said discharge chute is dimensioned and constructed to also deflect grass clippings downwardly into the ground outwardly of the mower housing when connected to the mower housing.

11. In a power lawn mower including a blade housing including a top portion and a peripheral skirt depending from the top portion with said top portion having means defining a generally annular grass discharge passage in the mower housing, said housing having an opening communicating with said grass discharge passage; a discharge chute removably attached to the mower housing in communication with said opening for directing grass clippings outwardly from the mower housing, an electrical ground contact mounted on the top central portion of the housing and extending outwardly towards said opening in the housing in removable contact with said chute, and a ground wire having one end connected to the ground contact and an opposite end adapted to be connected to the ignition system of a motor mounted on the central portion of the housing.

12. In a power lawn mower the combination including, a blade housing including front and rear ends, a top and an outer peripheral skirt depending from the top to define a space for housing a rotary blade, said top including an apertured central portion for receiving a motor which drives the blade, an annular portion interconnecting said central portion and said skirt, said annular top portion extending arcuately generally from the rear end of the housing to and around the front end of the housing for an annular distance between 180 and 270 degrees while gradually increasing in height to define a grass discharge passage in the housing, said grass discharge passage having an outlet facing partly rearwardly and partly laterally of the housing, said housing having an opening extending in said top portion and skirt to the lower edge thereof adjacent the outlet of said discharge passage for accommodating a discharge chute used to direct grass clippings from the outlet of said discharge passage, a discharge chute adapted to be attached in the opening in the mower housing in communication with the outlet of the discharge passage for conveying grass clippings out of the mower housing in a partly rearward and lateral direction, means for removably securing the discharge chute to the mower housing in said opening thereof, said last recited means including a key depending downwardly from the top of the mower housing at one side of said opening in the mower housing, and a slot formed in said chute dimensioned to receive said key.

13. For use in a lawn mower having a rotary blade, a housing enclosing the blade and including a top portion, an outer skirt depending from the top portion, and an opening in the top portion and skirt for use in directing grass clippings outwardly from the housing; a grass discharge chute having a body including an elongated chute passage, a horizontal flange projecting laterally outwardly from said body at an oblique angle relative to said chute passage, a vertical flange projecting downwardly below said chute passage, said chute adapted to be attached to the mower housing in communication with the interior of the mower housing and with said horizontal flange overlying and closing a portion of the opening in said housing top and with the depending vertical flange overlying the remaining portion of said opening lying in said skirt to form in effect a continuation of said skirt.

14. The discharge chute defined in claim 13, further including a deflector portion extending downwardly below said horizontal flange to deflect grass clippings upwardly into the chute passage.

15. The discharge chute defined in claim 13, wherein the outer surface of the chute on the vertical flange is convexly curved to conform to the curvature of the skirt.

16. A blade housing for a power lawn mower including a top portion and a peripheral skirt depending from the top portion, said top portion having means defining a generally annular grass discharge passage terminating in an outlet facing partly rearwardly and partly laterally of the housing, said housing having an opening extending in the skirt to the lower edge thereof and the top portion adjacent said outlet for accommodating a discharge chute adapted to be removably attached to the housing in communication with said outlet, said housing having an edge portion in said skirt and top portion defining the rearwardly positioned side of said opening, said edge portion being sufficiently spaced from said outlet for permitting said opening to receive a chute in alignment with said outlet and in abutting engagement with said edge portion for directing grass clippings laterally outwardly from the outlet.

17. The blade housing defined in claim 16 wherein said top wall has a key means depending therefrom on a side of said opening opposite said outlet for locating a chute in position in said opening.

18. The blade housing defined in claim 17 further including means for removably attaching a chute to the housing comprising a bracket projecting from a lower edge portion of said skirt adjacent said opening, a first bolt projecting upwardly adjacent said outlet from said means defining said discharge passage, and a second bolt projecting upwardly from said top portion adjacent said key means.

19. The blade housing defined in claim 16 wherein said outlet and a substantial portion of said opening are located in a front quadrant of the housing.

20. The blade housing defined in claim 16 wherein said opening extends an angular distance of approximately 60° (degrees) in the skirt measured along the circumference of the skirt.

References Cited
UNITED STATES PATENTS

| | | | |
|---|---|---|---|
| 2,880,563 | 4/1956 | Nottmeyer | 56—25.4 |
| 2,910,818 | 11/1959 | Beal et al. | 56—25.4 |
| 2,957,295 | 10/1960 | Brown | 56—25.4 |

(Other references on following page)